(12) United States Patent
Moriyama et al.

(10) Patent No.: US 12,077,207 B2
(45) Date of Patent: Sep. 3, 2024

(54) OUTER TUBE WITH HOLE COVER

(71) Applicant: NSK LTD., Tokyo (JP)

(72) Inventors: Seiichi Moriyama, Maebashi (JP);
Keisuke Nakao, Maebashi (JP);
Kaname Yasuda, Maebashi (JP);
Naofumi Fujita, Maebashi (JP)

(73) Assignee: NSK LTD., Tokyo (JP)

( * ) Notice: Subject to any disclaimer, the term of this patent is extended or adjusted under 35 U.S.C. 154(b) by 225 days.

(21) Appl. No.: 17/772,779

(22) PCT Filed: Nov. 5, 2020

(86) PCT No.: PCT/JP2020/041269
§ 371 (c)(1),
(2) Date: Apr. 28, 2022

(87) PCT Pub. No.: WO2021/090853
PCT Pub. Date: May 14, 2021

(65) Prior Publication Data
US 2022/0363304 A1    Nov. 17, 2022

(30) Foreign Application Priority Data
Nov. 7, 2019    (JP) ................... 2019-202006

(51) Int. Cl.
*B62D 1/20*    (2006.01)
*F16J 15/52*    (2006.01)

(52) U.S. Cl.
CPC ............... *B62D 1/20* (2013.01); *F16J 15/52* (2013.01)

(58) Field of Classification Search
CPC ... B62D 1/20; B62D 1/185; B62D 1/16; F16J 15/52; F16J 3/04; F16J 15/002
See application file for complete search history.

(56) References Cited

U.S. PATENT DOCUMENTS 10,843,246 B2 * 11/2020 Pale ..................... B21K 1/26
11,022,179 B2 * 6/2021 Moriyama ............ F16D 3/065
(Continued)

FOREIGN PATENT DOCUMENTS

| JP | WO 2003/031250 A1 | 4/2003 |
| JP | 2007055380 A * | 3/2007 |

(Continued)

OTHER PUBLICATIONS

Computer generated English translation of JP 2007-55380 to Kanno; generated from WIPO website (Year: 2024).*

(Continued)

Primary Examiner — Amy R Weisberg
Assistant Examiner — Tiffany L Webb
(74) Attorney, Agent, or Firm — Sughrue Mion, PLLC

(57) ABSTRACT

Provided is an outer tube including a solid-shaped male-shaft portion and a bottomed cylindrical female-tube portion integrally formed with the male shaft portion. A hole cover is externally fitted to the female-tube portion and closes a gap between a dash panel separating the vehicle cabin interior and the vehicle cabin exterior of a vehicle body and the outer tube. In an assembled state in the vehicle body, the solid male-shaft portion is arranged in the vehicle cabin exterior, and an opening portion of a slide hole provided in the female-tube portion is arranged in the vehicle cabin interior.

10 Claims, 14 Drawing Sheets

(56) References Cited

U.S. PATENT DOCUMENTS

| | | | |
|---|---|---|---|
| 11,541,450 B2 * | 1/2023 | Suehiro | B62D 5/04 |
| 2004/0245759 A1 | 12/2004 | Yamada et al. | |
| 2019/0277333 A1 | 9/2019 | Moriyama et al. | |
| 2020/0378445 A1 | 12/2020 | Moriyama et al. | |

FOREIGN PATENT DOCUMENTS

| | | |
|---|---|---|
| JP | WO 2018/021443 A1 | 2/2018 |
| JP | 2018-131025 A | 8/2018 |
| JP | 2019-31993 A | 2/2019 |
| JP | WO 2019/027004 A1 | 2/2019 |
| JP | 2019-44945 A | 3/2019 |
| JP | 2019-82217 A | 5/2019 |
| JP | 2019-90455 A | 6/2019 |

OTHER PUBLICATIONS

English translation of JP2007-55380 from WIPO website (Year: 2024).*
International Search Report for PCT/JP2020/041269 dated Dec. 22, 2020.
Written Opinion for PCT/JP2020/041269 dated Dec. 22, 2020.

\* cited by examiner

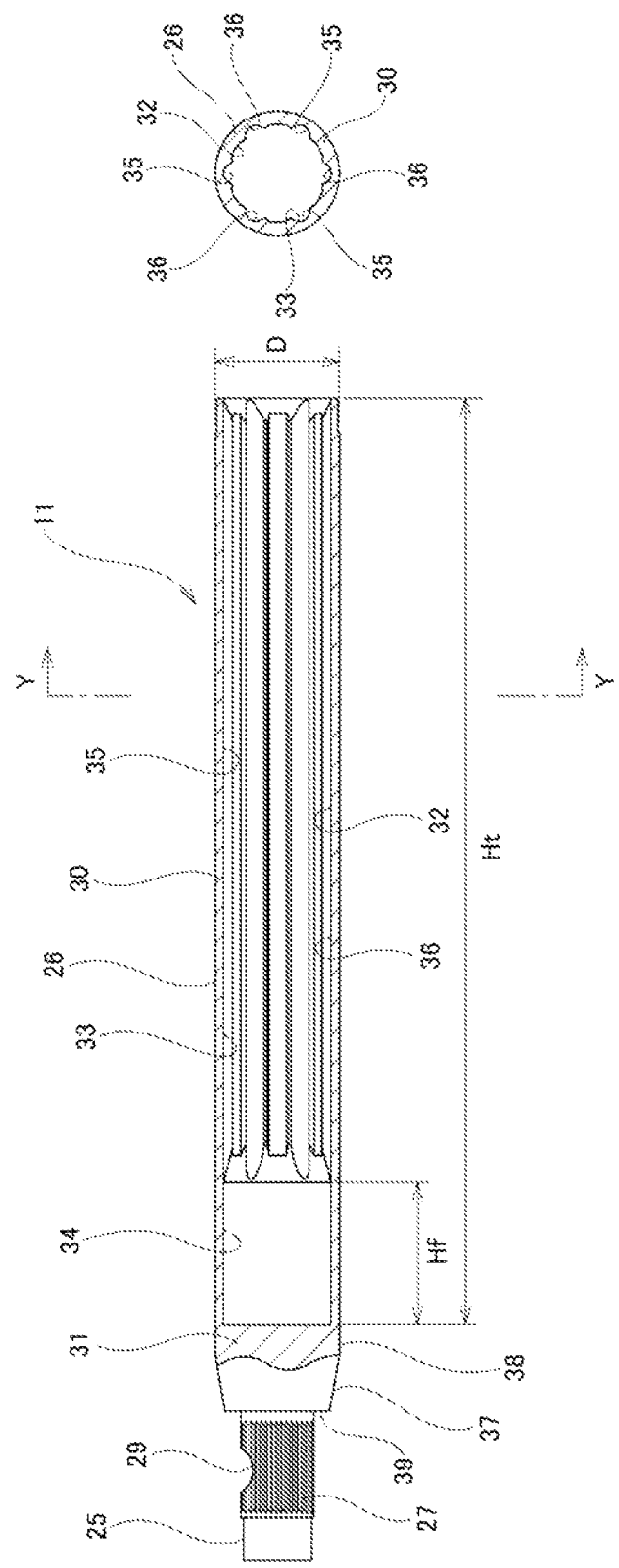

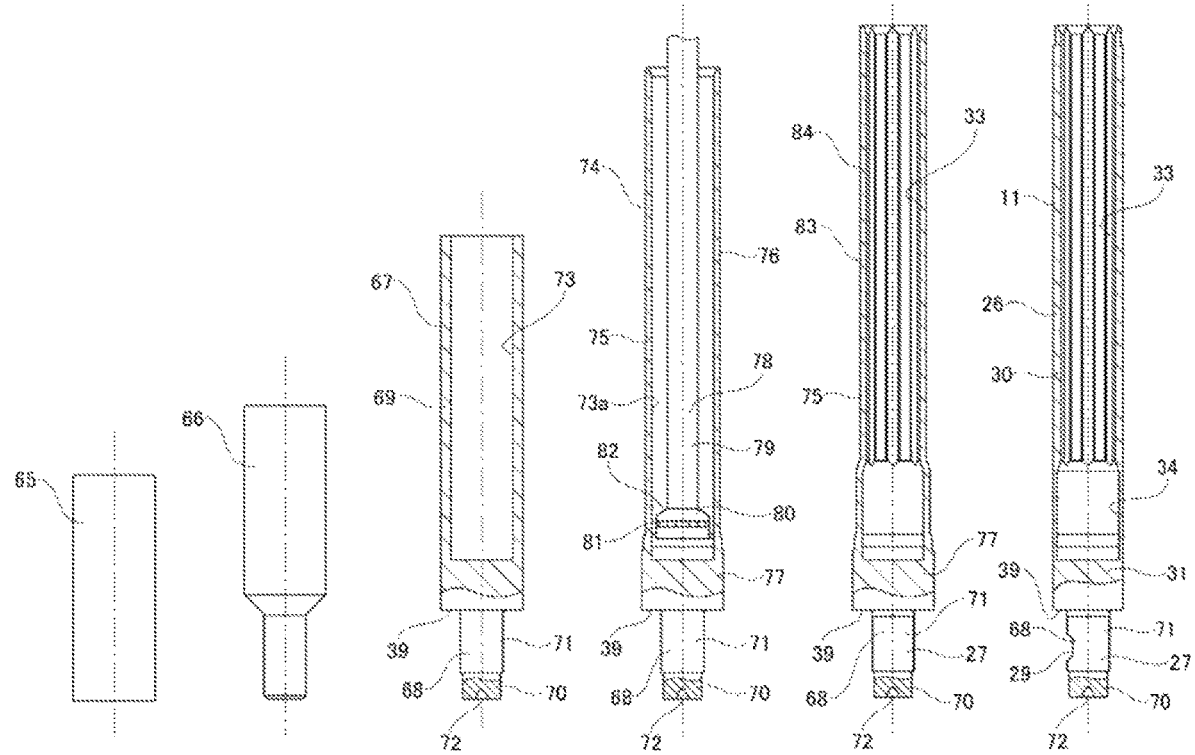

OUTER TUBE WITH HOLE COVER

CROSS REFERENCE TO RELATED APPLICATIONS

This application is a National Stage of International Application No. PCT/JP2020/041269 filed Nov. 5, 2020, claiming priority based on Japanese Patent Application No. 2019-202006 filed Nov. 7, 2019, the entire contents of which are incorporated herein by reference.

TECHNICAL FIELD

The present invention relates to an outer tube with hole cover of an intermediate shaft of a steering apparatus.

BACKGROUND ART

In a steering apparatus for an automobile, a front-end portion of a steering shaft with a steering wheel is fastened to a rear-end portion thereof, and a pinion shaft of a steering-gear unit are connected via an intermediate shaft. As the intermediate shaft, an extending/contracting type intermediate shaft having a total length that can be extended and contracted may be used. An extending/contracting type intermediate shaft, by extending or contracting the total length, demonstrates functions such as absorbing impact during a collision accident, absorbing relative displacement between a vehicle body and a subframe in a vehicle with a steering-gear unit mounted on the subframe, and the like.

An extending/contracting type intermediate shaft includes an outer tube, and an inner shaft that is inserted into an inner side of the outer tube so as to enable transmission of torque and relative displacement in the axial direction. As described in JP 2018-131025 A (Patent Literature 1) or the like, a yoke of a universal joint may be integrally provided on an end portion of the outer tube, or a yoke separate from the outer tube may be fastened to the end portion of the outer tube by a joining method such as welding or the like.

On the other hand, as described in JP 2019-082217 A (Patent Literature 2), in a steering apparatus installed in a large automobile, it is feasible, due to a reason such as a distance from the steering shaft to the steering-gear unit becoming long or the like, to connect an extension shaft having an energy absorbing function or the like to the end portion of the outer tube without providing the yoke directly.

In a case where an extension shaft is connected to the end portion of the outer tube, depending on the structure of the extension shaft, it may be necessary to provide a male-shaft portion, having an outer-side engaging portion with a non-circular cross-sectional shape on an outer-peripheral surface thereof, on the end portion of the outer tube. In this case, a configuration is necessary in which the male-shaft portion having an outer-side engaging portion with a non-circular cross-sectional shape on an outer-peripheral surface for connecting the outer tube to the extension shaft, is coaxially provided with a female-tube portion having an inner-side engaging portion with a non-circular cross-sectional shape on an inner-peripheral surface in which an inner shaft can be slidably inserted.

CITED LITERATURE

Patent Literature

[Patent Literature 1] JP 2018-131025 A
[Patent Literature 2] JP 2019-082217 A

SUMMARY OF INVENTION

Technical Problem

Considering workability and weight, preferably, the outer tube including a coaxial male-shaft portion having an outer-side engaging portion with a non-circular cross-sectional shape on an outer-peripheral surface and female-tube portion having an inner-side engaging portion with a non-circular cross-sectional shape on an inner-peripheral surface, is configured so as to have an overall hollow tubular shape. However, an outer tube of an intermediate shaft of a steering apparatus, in a state of being assembled in a vehicle body, is arranged with at least a part thereof in the vehicle cabin exterior (in the engine room), and thus there is a possibility that in the outer tube configured so as to have an overall hollow tubular shape, foreign matter such as moisture or the like may enter inside the female-tube portion in which the inner shaft is inserted and hinder smooth extending/contracting operation of the intermediate shaft.

Taking such a situation into consideration, it is possible to configure only the male-shaft portion so as to have a solid shape, and connect (join) the solid-shaped male-shaft portion with the tubular-shaped female-tube portion by welding or the like to cover an opening portion on one side in the axial direction of the female-tube portion by the male-shaft portion. With an outer tube in which the solid-shaped male-shaft portion and the tubular-shaped female-tube portion are connected, it is possible for the male-shaft portion to prevent foreign matter such as moisture or the like from entering an inner portion of the female-tube portion.

However, in a case of connecting the male-shaft portion and the female-tube portion by welding, not only is a connecting process necessary, but also after welding, a process is necessary for removing the outer peripheral portion of the weld bead portion that protrudes radially outward from adjacent portions by a cutting process using a lathe or the like, which causes the processing cost to increase. Moreover, in order to ensure the reliability of the welded portion, it is also necessary to carry out welding in combination with other joining methods such as caulking or the like, and thus the manufacturing costs tend to increase. Furthermore, due to the presence of a joint portion such as a weld portion or the like, there is a possibility that problems will occur such as it becoming difficult to secure the effective length of the inner-peripheral-side engaging portion (the amount of extension and contraction of the intermediate shaft), or becoming difficult to secure the phase accuracy between the male-shaft portion and the female-tube portion.

The present invention has been made in order to solve the problems described above, with an object of the present invention being to achieve a structure in which it is possible to prevent foreign matter from entering an inner portion of the female-tube portion of the outer tube in which the inner shaft is inserted, and to suppress an increase in manufacturing cost of the outer tube.

Solution to Problem

The outer tube with hole cover according to one aspect of the present invention includes an outer tube constituting an intermediate shaft of a steering apparatus arranged in an assembled state in a vehicle body so as to be inserted through a panel (dash panel) dividing a vehicle cabin interior and a vehicle cabin exterior; and a hole cover configured to cover a gap between the outer tube and the panel.

The outer tube is a cold forged product and includes a male-shaft portion having a solid shape, and a female-tube portion having a bottomed cylindrical shape and integrally formed with the male-shaft portion.

The male-shaft portion has an outer-peripheral-side engaging portion having a non-circular cross-sectional shape on an outer-peripheral surface and is arranged on an end portion on one side in the axial direction of the outer tube.

The female-tube portion has s slide hole opening only to the other side in the axial direction and provided with an inner-peripheral-side engaging portion having a non-circular cross-sectional shape on an inner-peripheral surface thereof, and the female-tube portion is coaxially arranged adjacent to the male-shaft portion on the other side in the axial direction of the male-shaft portion.

The hole cover is externally fitted to the female-tube portion.

As a result, the outer tube with hole cover according to one aspect of the present invention, in an assembled state in a vehicle body, is such that the male-shaft portion is arranged in the vehicle cabin exterior and an opening portion of the slide hole is arranged in the vehicle cabin interior.

In one aspect of the present invention, of the outer surface (including the outer-peripheral surface and end surfaces) of the female-tube portion, at least a portion where the hole cover is externally fitted and a portion located farther on the one side in the axial direction than the portion where the hole cover is externally fitted can undergo a rust preventing treatment.

In one aspect of the present invention, it is possible to use, for example a plating process or a coating process as the rust preventing treatment.

In one aspect of the present invention, the outer diameter (circumscribed circle diameter of an outer-peripheral-side engaging portion) of the male-shaft portion is made to be smaller than the outer diameter of the female-tube portion, and the outer-peripheral surface of the male-shaft portion and the outer-peripheral surface of the female-tube portion may be connected through a circular ring-shaped shoulder portion that is the end surface on the one side in the axial direction of the female-tube portion The shoulder portion can be located on a virtual plane that is orthogonal to the center axis of the female-tube portion.

In one aspect of the present invention, the female-tube portion may include a tube body having a cylindrical surface shaped outer-peripheral surface, and a bottom portion covering an opening of an end portion on the one side in the axial direction of the tube body.

In this case, the tube body may include the inner-peripheral-side engaging portion in a range from an end portion on the other side in the axial direction of an inner-peripheral surface to an intermediate portion in the axial direction, and a non-formed portion having a cylindrical surface shape on an end portion on the one side in the axial direction of the inner-peripheral surface. Note that the non-formed portion also includes a portion in which the inner-peripheral-side engaging portion is incompletely formed.

In one aspect of the present invention, the tube body may include an outer diameter that is constant in the axial direction.

In one aspect of the present invention, the bottom portion may include a tapered portion having a conical surface shape in a portion on at least the one side in the axial direction of an outer-peripheral surface thereof, an outer diameter the tapered portion decreasing as going from the other side in the axial direction toward the one side in the axial direction.

In this case, the hole cover may include a seal lip on a portion on the one side in the axial direction of an end portion on an inner side in the radial direction, a tip-end portion of the sela lip being in contact with the outer-peripheral surface of the tube body with interference; and an inner diameter in a free state of the seal lip is larger than an outer diameter of an end portion on the one side in the axial direction of the tapered portion, and smaller than an outer diameter of an end portion on the other side in the axial direction of the tapered portion, or in other words, the outer diameter of the tube body.

In one aspect of the present invention, an inner diameter of the non-formed portion is larger than a circumscribed circle diameter of the inner-peripheral-side engaging portion.

In one aspect of the present invention, a length in the axial direction of the slide hole is five times or more an outer diameter of the tube body.

In one aspect of the present invention, a length in the axial direction of the non-formed portion is three times or less the outer diameter of the tube body.

Effect of Invention

With the outer tube with hole cover of the present invention, together with being able to prevent foreign matter from entering the inner side of the female-tube portion of the other tube into which the inner shaft is inserted, it is possible to suppress the manufacturing cost of the outer tube.

BRIEF DESCRIPTION OF DRAWINGS

FIG. 5A is a partial cross-sectional view illustrating a removed outer tube of the first example, and FIG. 5B is a cross-sectional view of section Y-Y in FIG. 5A.

FIG. 9A illustrates an initial state of the assembly work, and FIG. 9B illustrates a completed state of the assembly work.

FIG. 11A to FIG. 11F illustrate an example of a manufacturing process order of a method for manufacturing the outer tube of the first example.

FIG. 12A and FIG. 12B illustrate an inner-diameter groove forming tool used in the manufacturing process, wherein FIG. 12A is a side view of a tip-end portion thereof, and FIG. 12B is a cross-sectional view of section Z-Z in FIG. 12A.

DESCRIPTION OF THE EMBODIMENTS

First Example

Figure 1:
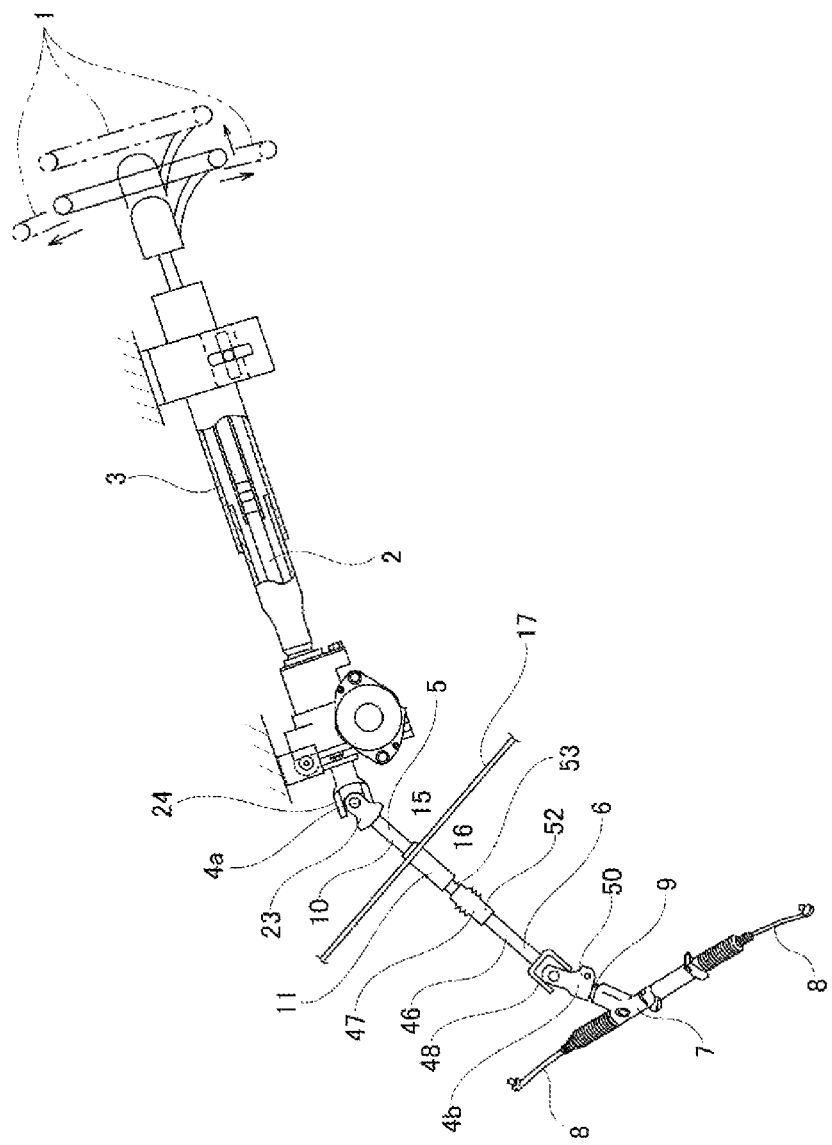
FIG. 1 is a schematic view illustrating an example of a steering apparatus provided with an outer tube according to the first example of an embodiment of the present invention.

A first example of an embodiment of the present invention will be described using FIG. 1 to FIG. 12B.

<Overview of a Steering Apparatus>

A steering apparatus of the present example is mounted in a large automobile, and includes: a steering wheel 1, a steering shaft 2, a steering column 3, a pair of universal joints 4a, 4b, an intermediate shaft 5, an extension shaft 6, a steering-gear unit 7, and a pair of tie rods 8.

The steering shaft 2 is rotatably supported on an inner side of the steering column 3 that is supported by a vehicle body. The steering wheel 1 that is operated by a driver is attached to a rear-end portion of the steering shaft 2, and a front-end portion of the steering shaft 2 is connected to a pinion shaft 9 of the steering-gear unit 7 via the universal joint 4a, intermediate shaft 5, extension shaft 6 and the other universal joint 4b. Therefore, when the driver turns the steering wheel 1, the rotation of the steering wheel 1 is transmitted to the pinion shaft 9 of the steering-gear unit 7. Rotation of the pinion shaft 9 is converted to linear motion of a rack shaft that is engaged with the pinion shaft 9, and pushes and pulls the pair of tie rods 8. As a result, a steering angle is applied to steered wheels according to an operating amount of the steering wheel 1.

Note that the front-rear direction refers to the front-rear direction of the vehicle body in which the steering apparatus is assembled. In addition, with respect to an outer tube 11 (intermediate shaft 5), one side in the axial direction corresponds to the front side of the vehicle body, and the other side in the axial direction corresponds to the rear side of the vehicle body.

<Intermediate Shaft>

Figure 3:
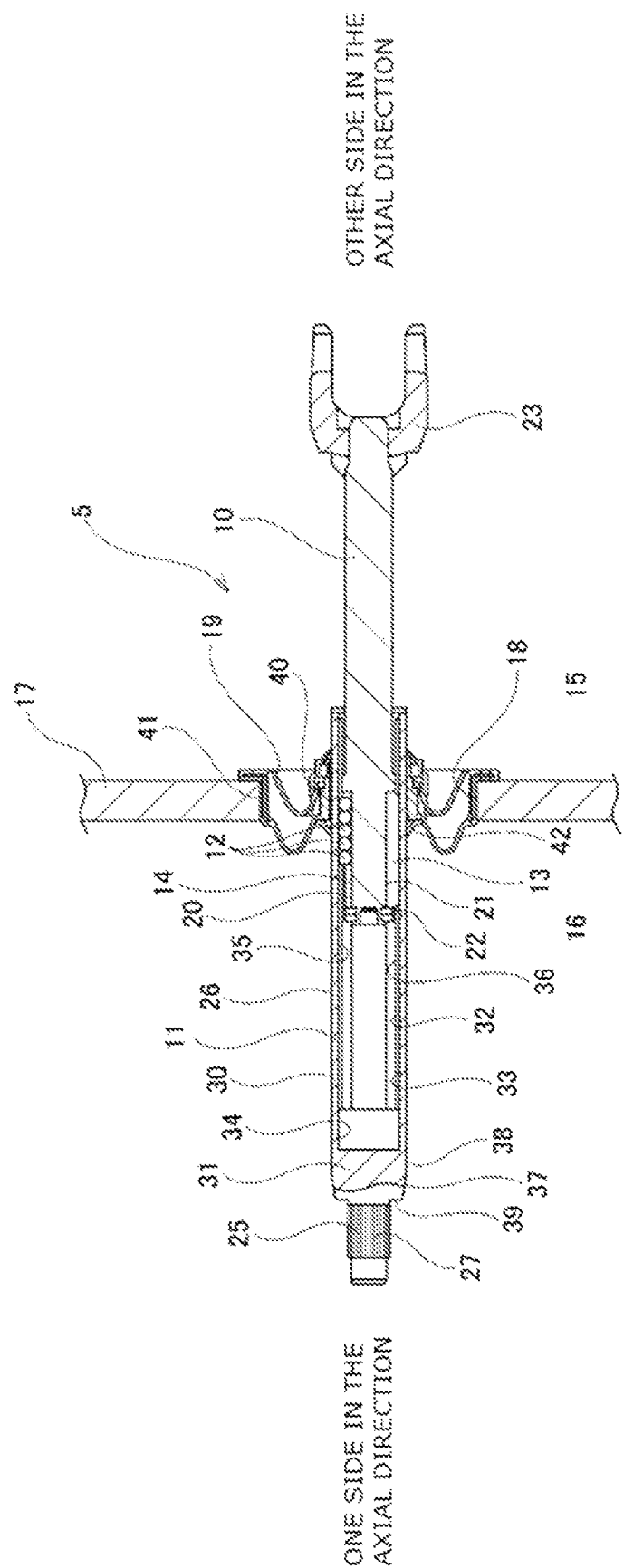
FIG. 3 is a cross-sectional view with the extension shaft in FIG. 2 omitted.

The intermediate shaft 5 is configured such that the overall length is able to extend and contract, and as illustrated in FIG. 3, includes: an inner shaft 10, an outer tube 11, a plurality of balls 12, a plurality of rollers 13, and a plurality of plate springs 14.

The intermediate shaft 5 is arranged by being inserted in the front-rear direction through a through hole 18 provided in a dash panel 17 that is arranged so as to separate the vehicle cabin interior 15 and vehicle cabin exterior (engine room) 16. A hole cover (dust cover) 19 is arranged so as to span between an outer-peripheral surface of the intermediate shaft 5 and an inner-peripheral surface (inner-peripheral edge) of the through hole 18, and covers a space between the outer-peripheral surface of the intermediate shaft 5 and the inner-peripheral surface of the through hole 18.

The inner shaft 10 is configured into a solid shape over the entire length, and first male-side axial grooves 20 and second male-side axial grooves 21, each extending in the axial direction, are formed on the outer-peripheral surface of a portion on the one side in the axial direction so as to alternate in the circumferential direction. The first male-side axial grooves 20 have a substantially isosceles trapezoidal cross-sectional shape where the width in the circumferential direction of an opening portion is wider than the width in the circumferential direction of the bottom portion. On the other hand, the second male-side axial grooves 21 have a concave arc shaped cross-sectional shape. Moreover, a stopper 22 having a ring shape is fastened to the outer-peripheral surface of an end portion on the one side in the axial direction of the inner shaft 10. The stopper 22 prevents the balls 12 that are arranged on the inner side of the first male-side axial grooves 20 and the rollers 13 that are arranged on the inner side of the second male-side axial grooves 21 from coming out toward the one side in the axial direction from the first male-side axial grooves 20 and the second male-side axial grooves 21. In addition, a yoke 23 that is separate from the inner shaft 10 is fastened by welding to an end portion on the other side in the axial direction of the inner shaft 10. The yoke 23, together with another yoke 24 and a cross shaft that are connected to the front-end portion of the steering shaft 2, forms the universal joint 4a.

The outer tube 11 is a cold forged product, and as illustrated in FIG. 5A, the solid-shaped (substantially columnar-shaped) male-shaft portion 25 arranged on the end portion on the one side in the axial direction is integrally formed with the cylindrical-shaped female-tube portion 26 having a bottom adjacently arranged on the other side in the axial direction of the male-shaft portion 25. In other words, the male-shaft portion 25 and the female-tube portion 26 are not joined by a joining method such as welding, caulking or the like, but as will be described later, are integrally formed by plastically deforming a blank material 65 using cold forging. The male-shaft portion 25 and the female-tube portion 26 are coaxially arranged. The outer diameter of the male-shaft portion 25 is smaller than the outer diameter of the female-tube portion 26, and the length in the axial direction of the male-shaft portion 25 is sufficiently shorter than the length in the axial direction of the female-tube portion 26.

The male-shaft portion 25 is a portion connected to the extension shaft 6, and in an intermediate portion in the axial direction of the outer-peripheral surface, has an outer-peripheral-side engaging portion 27 having a non-circular cross-sectional shape.

Figure 6A:
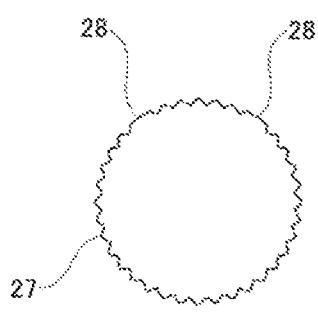
FIG. 6A is a diagram illustrating the contour lines of the outer-peripheral-side engaging portion.
Figure 6B:
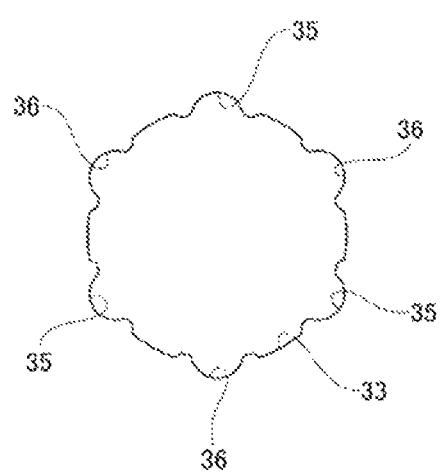
FIG. 6B is a diagram illustrating the contour lines of the inner-peripheral-side engaging portion.
Figure 7A:
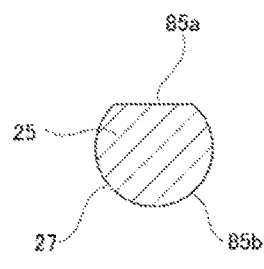
FIG. 7A to FIG. 7D are cross-sectional views illustrating four examples of modifications of the outer-peripheral-side engaging portion.
Figure 7B:
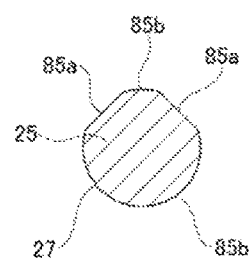
Figure 7C:
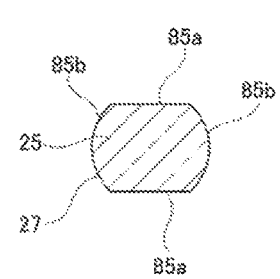
Figure 7D:
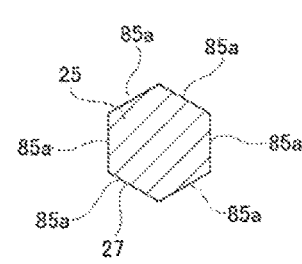

In this example, as illustrated in FIG. 6A, the outer-peripheral-side engaging portion 27 is a male serration that includes non-toothed portions 28 at two locations that are separated in the circumferential direction (central angle is shifted by about 70 degrees). However, as long as the outer-peripheral-side engaging portion 27 has a cross-sectional shape capable of transmitting torque between the outer-peripheral-side engaging portion 27 and the extension shaft 6 (as long as the cross-sectional shape is non-circular), the shape is not limited to a male serration. For example, it is possible to use a modified structure as illustrated in FIGS. 7A to 7D. More specifically, as in the first example of a modification illustrated in FIG. 7A, the cross-sectional shape (contour shape) of the outer-peripheral-side engaging portion 27 may be an incomplete circular shape having a straight portion (flat portion) 85a at one location in the circumferential direction with the remaining being an circular arc-shaped portion 85b, and as in the second example and the third example of modifications illustrated in FIG. 7B and FIG. 7C, may be a shape having straight portions 85a at two locations in the circumferential direction with the pair of straight portions 85a being connected by circular arc-shaped portions 85b. Furthermore, as in the fourth example of a modification illustrated in FIG. 7D, the cross-sectional shape of the outer-peripheral-side engaging portion 27 may be a polygonal shape such as a hexagonal shape consisting of only six straight portions 85a.

The male-shaft portion 25, as illustrated in FIG. 5A, has an engaging notch 29 at one location in the circumferential direction of the outer-peripheral surface that extends in an orthogonal direction to the center axis of the outer tube 11.

The female-tube portion 26 is a portion in which the inner shaft 10 is slidably inserted and includes a cylindrical-shaped tube body 30 and a bottom portion 31 that closes an opening on an end portion on the one side in the axial direction of the tube body 30. The female-tube portion 26 has a slide hole 32 on the inside thereof that is open only to the other side in the axial direction.

The tube body 30 has an outer-peripheral surface having a cylindrical surface shape (circular cross section), and the outer diameter D is constant over the entire length in axial direction. The tube body 30 (slide hole 32) has an inner-peripheral-side engaging portion 33 having a non-circular cross-sectional shape in a range extending from the end portion on the other side in the axial direction of the inner-peripheral surface to an intermediate portion in the axial direction. Moreover, on the one side in the axial direction of the inner-peripheral-side engaging portion 33, the tube body 30 has a non-formed portion 34. The non-formed portion 34 has a cylindrical surface shape (circular cross section) in which the inner-peripheral-side engaging portion 33 is not formed on the end portion on the one side in the axial direction of the inner-peripheral surface. Note that the non-formed portion 34 also includes a portion in which the inner-peripheral-side engaging portion 33 is incompletely formed. In other words, the non-formed portion 34 includes a portion of the end portion on the one side in the axial direction of the inner-peripheral-side engaging portion 33 where the groove depth of first female-side axial grooves 35 and second female-side axial grooves 36 (described later) becomes shallower as going toward the one side in the axial direction.

The length Ht in the axial direction of the slide hole 32 is four times or more than the outer diameter of the tube body 30 (Ht≥4D), and more preferably, is five times or more (Ht≥5D). The length Hf in the axial direction of the non-formed portion 34 is three times or less than the outer diameter of the tube body 30 (Hf≤3D). Moreover, the inner diameter of the non-formed portion 34 is larger than the circumscribed circle diameter of the inner-peripheral-side engaging portion 33.

In this example, as illustrated in FIG. 5B, the inner-peripheral-side engaging portion 33 is configured by first female-side axial grooves 35 and second female-side axial grooves 36 that each extend in the axial direction and are alternately arranged in the circumferential direction. The first female-side axial grooves 35 and the second female-side axial grooves 36 each have a concave arc-shaped cross-sectional shape. However, as long as engagement in which torque can be transmitted and relative displacement in the axial direction with respect to the inner shaft 10 is possible, female splines may be used as in the second example and the third example of an embodiment of the present invention described later. Moreover, the cross-sectional shape of the inner-peripheral-side engaging portion may be a shape that includes straight portions (flat portions) at one or a plurality of locations in the circumferential direction, or may be a polygonal shape such as a hexagonal shape consisting of only straight portions.

The outer diameter of the male-shaft portion 25 (circumscribed circle diameter of the outer-peripheral-side engaging portion 27) is not only smaller than the outer diameter of the female-tube portion 26, but is also smaller than the inner diameter of the female-tube portion 26 (inscribed circle diameter of the inner-peripheral-side engaging portion 33).

The bottom portion 31 has an outer diameter that is equal to or less than the outer diameter of the tube body 30. In this example, the outer-peripheral surface of the bottom portion 31 is configured by a tapered portion 37 having a conical surface shape, and a cylindrical surface portion 38. The tapered portion 37 is provided in a range extending from an end portion on the one side in the axial direction of an outer-peripheral surface of the bottom portion 31 to an intermediate portion in the axial direction, and an outer diameter thereof becomes smaller as going from the other side in the axial direction to the one side in the axial direction. The inclination angle of the tapered portion 37 with respect to the center axis of the outer tube 11 is not particularly limited and may be appropriately set according to a dimension in the axial direction of the bottom portion 31 and an inner diameter of a seal lip 45a (described later) in a free state provided on the hole cover 19. The inclination angle of the tapered portion 37 can be preferably set to a value within a range from 3 degrees to 30 degrees. The cylindrical surface portion 38 is provided on an end portion on the other side in the axial direction of the outer-peripheral surface of the bottom portion 31, and has an outer diameter equal to the outer diameter D of the tube body 30, and the outer diameter does not change in the axial direction. Note that in a case of implementing the present invention, the entire outer-peripheral surface of the bottom portion may be a tapered portion (the cylindrical surface portion is not provided), or conversely, the entire outer-peripheral surface of the bottom portion may be a cylindrical surface portion (the tapered surface portion is not provided).

The outer-peripheral surface of the male-shaft portion 25 and the outer-peripheral surface of the bottom portion 31 of the female-tube portion 26 are connected via a shoulder portion 39, which is an end surface on the one side in the axial direction of the female-tube portion 26. The shoulder portion 39 is a circular ring surface existing on a virtual plane orthogonal to the center axis of the outer tube 11. An end portion on an outer side in the radial direction of the shoulder portion 39 and the end portion on the one side in the axial direction of the outer-peripheral surface of the bottom portion 31 are connected via a chamfered portion (R chamfered portion) having an arc-shaped cross-sectional shape.

In this example, as illustrated in FIG. 3, the hole cover 19 is externally fitted to a portion on the other side in the axial direction of the female-tube portion 26. As a result, in a state in which the intermediate shaft 5 is assembled in the vehicle body, a portion of the outer tube 11 that is farther on the one side in the axial direction than the hole cover 19 is arranged in the vehicle cabin exterior 16, and a portion farther on the other side in the axial direction than the hole cover 19 is arranged in the vehicle cabin interior 15. Therefore, the male-shaft portion 25 having a solid shape is arranged in the vehicle cabin exterior 16, and the opening portion of the slide hole 32 of the female-tube portion 26 is arranged in the vehicle cabin interior 15.

As described above, in a state of being assembled in the vehicle body, the outer tube 11, except for the end portion on the other side in the axial direction, is arranged in the vehicle cabin exterior 16. Therefore, in order to prevent the outer tube 11 from rusting, a rust preventing treatment is performed on an outer surface of the outer tube 11. As the rust preventing treatment, for example, a plating treatment such as zinc-nickel alloy plating or the like, or a coating treatment such as solvent coating, powder coating or the like can be used.

In a case where a plating treatment is used as the rust preventing treatment, it is possible, for example, to perform the plating treatment on the entire outer surface of the outer tube 11 (male-shaft portion 25 and female-tube portion 26). Moreover, in a case where masking (covering) is applied so that the inner-peripheral surface of the female-tube portion 26 is not plated, it is possible to perform the plating treatment on the outer surface of the male-shaft portion 25, and on a portion of the outer surface of the female-tube portion 26 where the hole cover 19 is externally fitted, and a portion of the outer surface of the female-tube portion 26 farther on the one side in the axial direction than the portion where the hole cover 19 is externally fitted. In other words, it is possible to perform the plating treatment over a range of the outer surface of the outer tube 11 excluding a portion farther on the other side in the axial direction than the portion where the hole cover 19 is externally fitted. However, it is also possible to perform the plating treatment (rust preventing treatment) on a portion of the outer surface of the female-tube portion 26 that is in contact with a seal lip 45a (described later) and a portion located farther on the one side in the axial direction than that portion.

In a case where a coating treatment is used as the rust preventing treatment, of the outer surface of the outer tube 11, it is possible to perform the coating treatment on the entire outer surface of the female-tube portion 26 and not on the male-shaft portion 25. Moreover, in a case where masking (covering) is applied so that the coating treatment is not performed on the inner-peripheral surface of the female-tube portion 26, it is possible to perform the coating treatment on a portion of the outer surface of the female-tube portion 26 where the hole cover 19 is externally fitted, and a portion of the outer surface of the female-tube portion 26 located farther on the one side in the axial direction than the portion where the hole cover 19 is externally fitted. In other words, it is possible to perform the coating treatment over a range of the outer surface of the female-tube portion 26 except a portion located farther on the other side in the axial direction than the portion where the hole cover 19 is externally fitted. Note that even in a case of performing either a plating treatment or a coating treatment, the rust preventing treatment is not to be performed on the inner-peripheral surface of the female-tube portion 26.

Figure 4A:
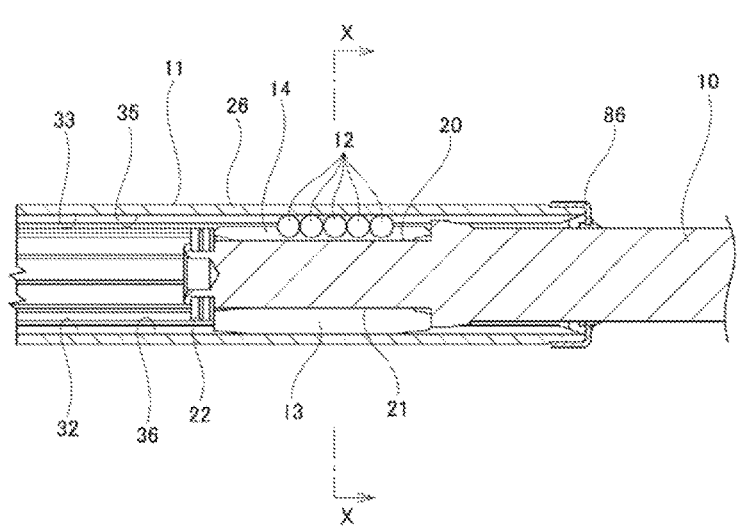
FIG. 4A is a partial enlarged view of FIG. 3.
Figure 4B:
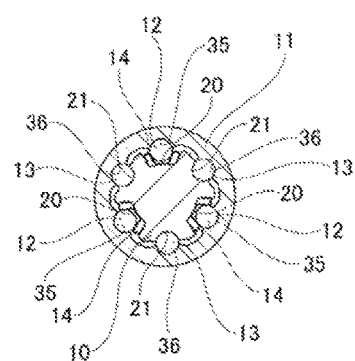
FIG. 4B is a cross-sectional view of section X-X in FIG. 4A.

When inserting the inner shaft 10 into the inner side of the outer tube 11, the phases in the circumferential direction of the first male-side axial grooves 20 and the first female-side axial grooves 35 are aligned, and the phases in the circumferential direction of the second male-side axial grooves 21 and the second female-side axial grooves 36 are aligned. As illustrated in FIG. 3 and FIGS. 4A and 4B, a plurality of balls 12 are arranged between the first male-side axial grooves 20 and the first female-side axial grooves 35. Furthermore, plate springs 14 are arranged between the first male-side axial grooves 20 and the plurality of balls 12 in order to apply pre-loading to the plurality of balls 12. Moreover, one roller 13 is arranged between each second male-side axial groove 21 and second female-side axial groove 36. In addition, as illustrated in FIG. 4A, a seal ring 86 is mounted on the end portion on the other side in the axial direction of the female-tube portion 26 to cover the opening portion of the slide hole 32.

Figure 8:
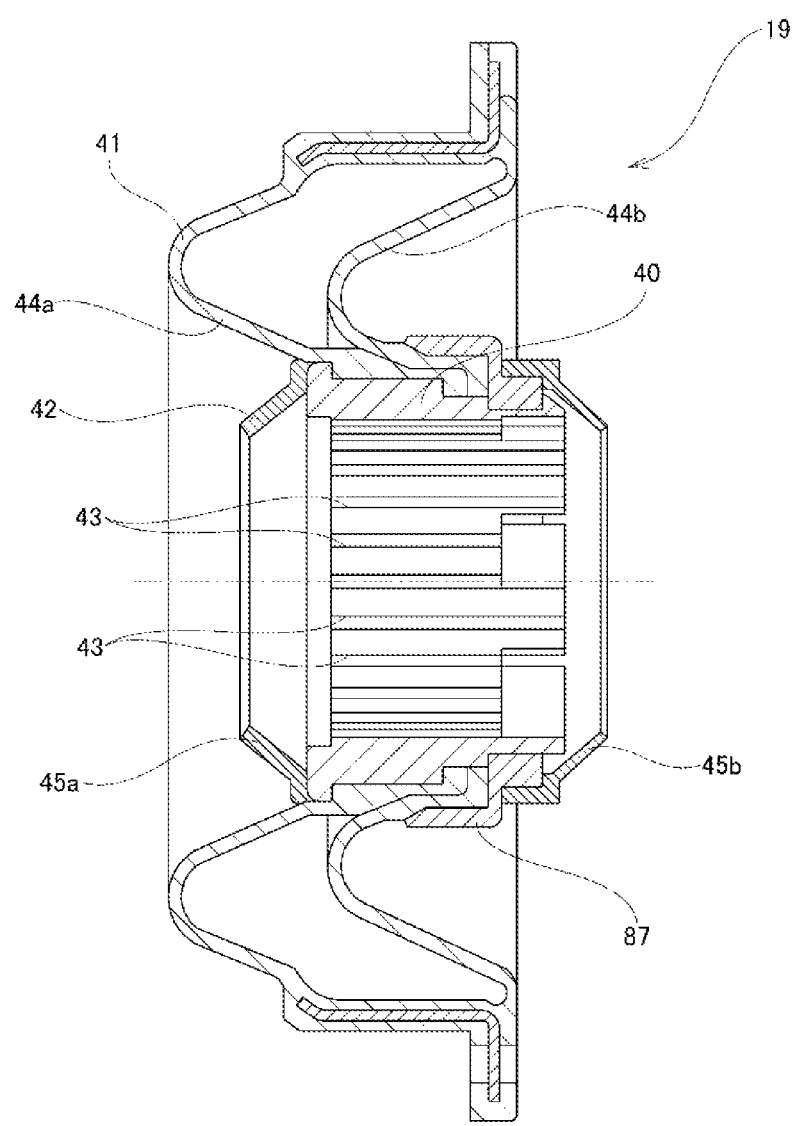
FIG. 8 is a cross-sectional view illustrating a removed hole cover of the first example.

The hole cover 19, as illustrated in FIG. 8, includes a bushing (slip bearing portion) 40, a main cover body 41, and a seal portion 42.

The bushing 40 is made of a low-friction material such as a polyamide resin having excellent slidability, and is formed into a cylindrical shape. The bushing 40 is externally fitted to a part on the other side in the axial direction of the female-tube portion 26 (tube body 30) of the outer tube 11. The bushing 40 has an inner diameter that is slightly larger than the outer diameter D of the tube body 30. The bushing 40 has one or a plurality of holding grooves 43 for holding grease on the inner-peripheral surface. In the illustrated example, the holding groove 43 extends linearly in the axial direction of the bushing 40; however, the direction that the holding groove 43 is formed in can be appropriately changed.

The main cover body 41 includes a pair of bellows portions 44a, 44b arranged apart from each other in the axial direction of the outer tube 11. The pair of bellows portions 44a, 44b is made of rubber such as ethylene propylene rubber and has flexibility. End portions on an outer side in the radial direction of the pair of bellows portions 44a, 44b are connected to each other, and internally fitted and fastened to the through hole 18 formed in the dash panel 17. End portions on an inner side in the radial direction of the pair of bellows portions 44a, 44b are externally fitted and fastened to the bushing 40. In the present example, a fastening ring 87 is externally fitted to the end portions on the inner side in the radial direction of the pair of bellows portions 44a, 44b, and prevents the pair of bellows portions 44a, 44b from separating from the bushing 40. The pair of bellows portions 44a, 44b is respectively bent so that the vehicle cabin exterior 16 side becomes convex, and allows extension, contraction and tilting of the intermediate shaft 5 that occurs when adjusting the position of the steering wheel 1 or when the intermediate shaft 5 absorbs vibration.

The seal portion 42 includes a pair of seal lips 45a, 45b arranged apart from each other in the axial direction of the outer tube 11. The pair of seal lips 45a, 45b is made of rubber such as acrylonitrile butadiene rubber and is respectively formed in an circular ring shape. Note that the shape of the seal lips 45a, 45b illustrated in the drawings is the shape in the free state.

Of the pair of seal lips 45a, 45b, the seal lip 45a arranged on the one side in the axial direction (vehicle cabin exterior 16 side) is a sealing member that separates a gap between the outer-peripheral surface of the female-tube portion 26 and the inner-peripheral surface of the bushing 40 and a space in the vehicle cabin exterior 16 side, with a base end portion being fixed to the end portion on the one side in the axial direction of the bushing 40, and a tip-end portion being in contact with the outer-peripheral surface of the female cylinder portion 26 with interference. As a result, the seal lip 45a, together with preventing foreign matter such as moisture from entering from the vehicle cabin exterior 16 into the gap between the outer-peripheral surface of the female-tube portion 26 and the inner-peripheral surface of the bushing 40, prevents grease that is applied to the inner-peripheral surface of the bushing 40 from leaking to the vehicle cabin exterior 16. The inner diameter in the free state of the seal lip 45a is set to be larger than the outer diameter of the end portion on the one side in the axial direction of the tapered portion 37 provided on the outer-peripheral surface of the bottom portion 31 of the female-tube portion 26, and is set to be smaller than the outer diameter (=outer diameter D of the tube body 30) of the end portion on the other side in the axial direction of the tapered portion 37.

Of the pair of seal lips 45a, 45b, the seal lip 45b arranged on the other side in the axial direction (vehicle cabin interior 16 side) is a sealing member that separates a gap between the outer-peripheral surface of the female-tube portion 26 and the inner-peripheral surface of the bushing 40 and a space on the vehicle cabin interior 15 side, with a base end portion being fixed to the end portion on the other side in the axial direction of the bushing 40, and a tip-end portion closely facing or being in contact with the outer-peripheral surface of the female cylinder portion 26 with interference. As a result, the seal lip 45b prevents grease that is applied to the inner-peripheral surface of the bushing 40 from leaking into the vehicle cabin interior 15. Note that in a case where the tip-end portion of the seal lip 45b is in contact with the outer-peripheral surface of the female-tube portion 26 with interference, the inner diameter in the free state of the seal lip 45b can be set to be the same as the inner diameter in the free state of the seal lip 45a.

Figure 9A:
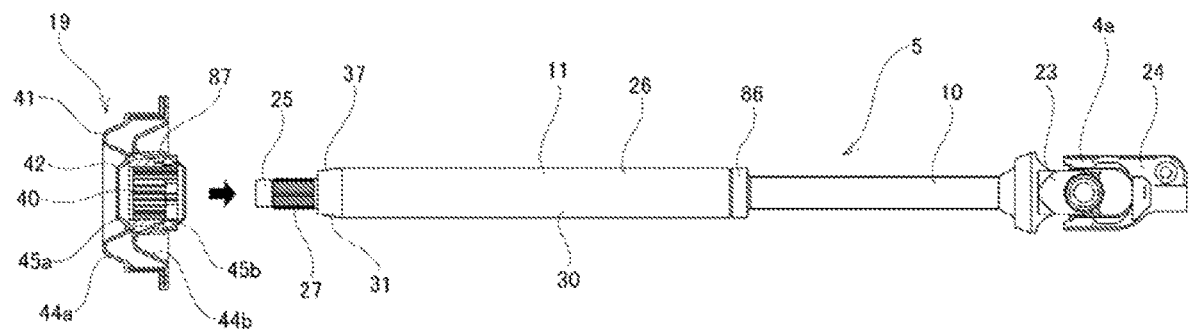
FIG. 9A and FIG. 9B illustrate a process order for performing assembly work of the hole cover, where
Figure 9B:
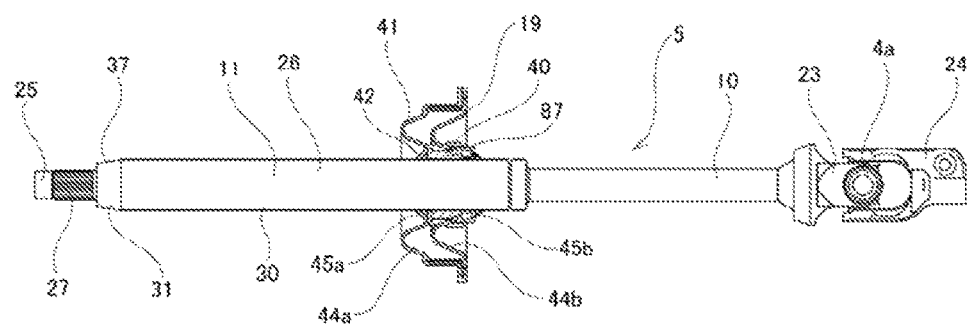

As illustrated in FIG. 9A, the hole cover 19 is externally fitted to the tube body 30 of the female-tube portion 26 of the outer tube 11 after the inner shaft 10 has been combined with the outer tube 11 so as to be able to slide. More specifically, the outer tube 11 is inserted into the inner side of the hole cover 19 with the male-shaft portion 25 inserted first, and is passed through the inner side of the hole cover 19 in the order of the male-shaft portion 25 and the bottom portion 31 of the female-tube portion 26. Then, as illustrated in FIG. 9B, the hole cover 19 is externally fitted to a portion on the other side in the axial direction of the tube body 30 of the female-tube portion 26. The outer tube 11 with hole cover 19 is configured in this way.

In this example, the inner diameter in the free state of the seal lip 45a (45b) is larger than the outer diameter of the end portion on the one side in the axial direction of the tapered portion 37 and smaller than the outer diameter of the end portion on the other side in the axial direction of the tapered portion 37. Therefore, when the tapered portion 37 is passed through the inner side of the seal lip 45a when assembling the hole cover 19, the tip-end portion of the seal lip 45a has interference.

In the intermediate shaft 5 having a configuration as described above, the inner shaft 10 and the outer tube 11 are combined so as to be able to transmit torque, and so as to be able to extend and contract over the entire length in a steady state. Moreover, in the intermediate shaft 5, during transmission of low torque, the plurality of balls 12 and plate springs 14 transmit torque between the inner shaft 10 and the outer tube 11, and when the torque to be transmitted increases, the increased torque is transmitted by the plurality of rollers 13. In addition, when there is relative displacement in the axial direction between the inner shaft 10 and the outer tube 11, the plurality of balls 12 roll between the first male-side axial grooves 20 and the first female-side axial grooves 35, and the plurality of rollers 13 slide and move between the second male-side axial grooves 21 and the second female-side axial grooves 36. Furthermore, due to the elastic force of the plate springs 14, the plurality of balls 12 are pressed against an inner surface of the first female-side axial grooves 35, and thus looseness between the inner shaft 10 and the outer tube 11 is prevented.

<Extension Shaft>

Figure 10:
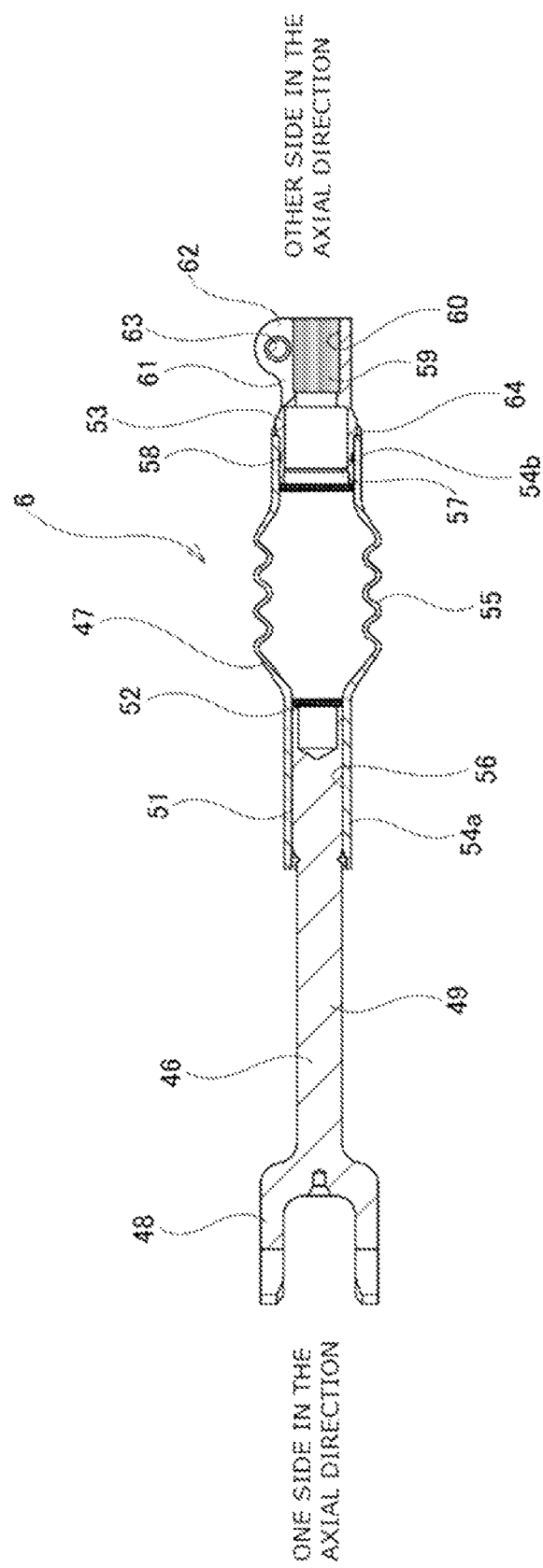
FIG. 10 is a cross-sectional view illustrating only a removed extension shaft of the first example.

The extension shaft 6, as illustrated in FIG. 10, is configured so as to be able to extend and contract over the entire length during the occurrence of a collision accident, and includes an inner shaft 46 and an outer cylinder 47. The inner shaft 46 and the outer cylinder 47 are coupled so as to be able to transmit torque, and so as to be able to displace relative to each other in the axial direction during a primary collision. In other words, the inner shaft 46 and the outer cylinder 47 are coupled such that in a steady state relative displacement in the axial direction is not possible.

The inner shaft 46 has a yoke portion 48 arranged on the one side in the axial direction, and a rod-shaped portion 49 arranged on the other side in the axial direction. In this example, the yoke portion 48 and the rod-shaped portion 49 are integrally formed.

The yoke portion 48, together with another yoke 50 and a cross shaft (not illustrated) that are connected to the pinion shaft 9 of the steering-gear unit 7, forms the universal joint 4b.

The rod-shaped portion 49 is configured to have a substantially columnar shape, and to have a solid shape over nearly the entire length. The rod-shaped portion 49 has a male serration 51 on an outer-peripheral surface on the other side in the axial direction.

The outer cylinder 47 includes a main outer cylinder body 52 arranged on the one side in the axial direction, and a joint portion 53 arranged on the other side in the axial direction. More specifically, the outer cylinder 47 is configured so that the main outer cylinder body 52 and the joint portion 53 are joined.

The main outer cylinder body 52 is configured into a hollow cylindrical shape. The main outer cylinder body 52 has a pair of coupling cylinder portions 54a, 54b on end portions on both sides in the axial direction, and a corrugated tubular bellows portion 55 at an intermediate portion in the axial direction.

Of the pair of coupling cylinder portions 54a, 54b, a first female serration 56 is provided on an inner-peripheral surface of the coupling cylinder portion 54a arranged on the one side in the axial direction, and a second female serration 57 is provided on an inner-peripheral surface of the coupling cylinder portion 54b arranged on the other side in the axial direction.

The bellows portion 55 is a portion that, by plastically deforming so as to bend, absorbs an impact load due to a collision, has sufficient torsional strength so as not to be deformed by a load in the torsional direction that is applied based on the operation of the steering wheel 1 by the driver during a steady state before the occurrence of a collision accident.

The joint portion 53 is configured into an overall substantially cylindrical shape. The joint portion 53 has a male serration 58 on an outer-peripheral surface of an end portion on the one side in the axial direction, and has an engaging hole 60 including a female serration 59 on an inner-peripheral surface of half of the other side in the axial direction. Moreover, the joint portion 53 has a slit 61 extending in the axial direction at one location in the circumferential direction of half of the other side in the axial direction, and a pair of flange portions 62 on both sides in the circumferential direction of the slit 61. In addition, screw holes 63 that are coaxial with each other are provided in the pair of flange portions 62.

In order to couple the main outer cylinder body 52 and the joint portion 53 to form the outer cylinder 47, the male serration 58 provided on the outer-peripheral surface of the joint portion 53 is engaged with the second female serration 57 provided on the inner-peripheral surface of the coupling cylinder portion 54b with a serration engagement. Moreover, the portion between the outer-peripheral surface of the joint portion 53 and the end portion on the other side in the axial direction of the coupling cylinder portion 54b is welded and fixed by a weld bead portion 64 over the entire circumference. As a result, the main outer cylinder body 52 and the joint portion 53 are coupled so as to be able to transmit torque.

Furthermore, in order to form the extension shaft 6 by connecting the inner shaft 46 and the outer cylinder 47, the male serration 51 of the inner shaft 46 and the first female serration 56 of the outer cylinder 47 are engaged with a serration engagement, and a fitting portion between the inner shaft 46 and the outer cylinder 47 functions as a so-called elliptical fitting. In other words, plastically deformed portions each having an elliptical-shaped cross-sectional shape are formed on an end portion on the other side in the axial direction of the rod-shaped portion 49 and on an end portion on the one side in the axial direction of the coupling cylinder portion 54a. Note that the plastically deformed portions resist displacement when there is relative displacement in the axial direction between the inner shaft 46 and the outer cylinder 47, and thus when there is relative displacement in the axial direction between the inner shaft 46 and the outer cylinder 47 and the extension shaft 6 contracts, the plastically deformed portions absorb energy from a collision.

Figure 2:
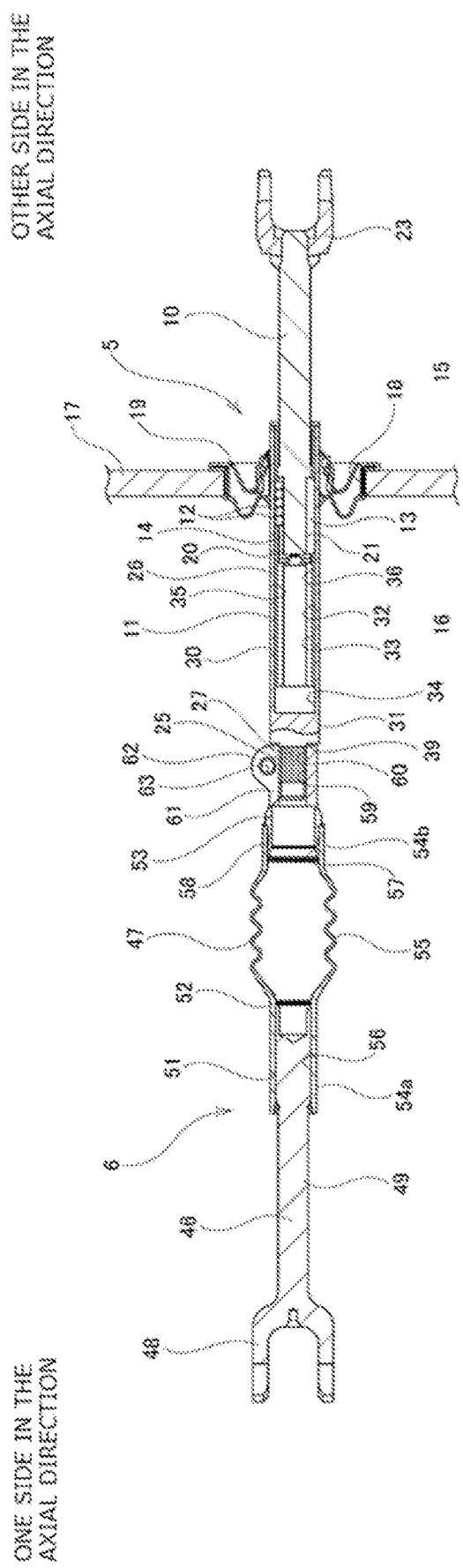
FIG. 2 is a cross-sectional view illustrating a removed intermediate shaft and extension shaft of the first example.

In this example, as illustrated in FIG. 2, in order to couple the intermediate shaft 5 and the extension shaft 6, the male-shaft portion 25 of the outer tube 11 is inserted inside the engaging hole 60 of the joint portion 53 of the extension shaft 6, and the outer-peripheral-side engaging portion 27 is engaged (serration engagement) with the female serration 59 such that torque can be transmitted. Furthermore, by screwing a bolt (not illustrated) into the pair of screw holes 63 provided in the joint portion 53, the diameter of the joint portion 53 is reduced so as to reduce the width of the slit 61. Then, the inner-peripheral surface (female serration 59) of the engaging hole 60 is pressed against the outer-peripheral surface (outer-peripheral-side engaging portion 27) of the male-shaft portion 25. Furthermore, the intermediate portion in the axial direction of the bolt inserted in the screw holes 63 is arranged in an inner side of the engaging notch 29 formed on the outer-peripheral surface of the male-shaft portion 25 to engage the bolt and male-shaft portion 25 in the axial direction. In this example, with this kind of configuration, the male-shaft portion 25 of the outer tube 11 is prevented from coming out in the axial direction from the engaging hole 60 of the joint portion 53, and the intermediate shaft 5 and the extension shaft 6 are coupled such that torque can be transmitted. Note that when inserting the male-shaft portion 25 of the outer tube 11 inside the engaging hole 60 of the joint portion 53 of the extension shaft 6, by bringing the shoulder portion 39 of the female-tube portion 26 of the outer tube 11 in contact with an end surface on the other side in the axial direction of the joint portion 53, the position where the outer tube 11 and the extension shaft 6 are coupled can be regulated, and the assembly workability can be improved.

In the steering apparatus of this example, in a steady state, the intermediate shaft 5 extends or contracts by relative displacement in the axial direction of the inner shaft 10 and the outer tube 11. As a result, vibration input to tires during traveling is absorbed. Moreover, in a case where so-called full-wrap collision occurs in which the entire front surface of the vehicle body collides with another automobile or the like, both the intermediate shaft 5 and the extension shaft 6 contract. As a result, impact due to the collision is absorbed, preventing the steering wheel 1 from being pushed toward the driver. Furthermore, in a case where so-called offset collision occurs in which a part of the front surface of the vehicle body collides with another automobile or the like, the bellows portion 55 bends due to the impact load associated with the collision. As a result, impact due to the collision is absorbed.

Next, an example of a manufacturing method for manufacturing the outer tube 11 of the intermediate shaft 5 will be described with reference to FIGS. 11A to 11F and FIGS. 12A and 12B.

<Manufacturing Method of Outer Tube>

In order to manufacture the outer tube 11, first, as illustrated in FIG. 11A, a columnar shaped blank material (billet) 65 is prepared. The blank material 65 is made of a metal such as carbon steel for machine structure (S15C), has a circular cross-sectional shape, and has a constant outer diameter over the entire length in the axial direction. In this example, the blank material 65 is coldly extruded forward to obtain a stepped shaft-shaped first intermediate blank material 66 as illustrated in FIG. 11B.

Next, the first intermediate blank material 66 is coldly extruded backward to obtain a second intermediate blank material 67 as shown in FIG. 11C. The second intermediate blank material 67 includes a solid shaft portion 68 and a bottomed cylindrical tubular portion 69 integrally formed with the shaft portion 68. The shaft portion 68 is composed of a small-diameter shaft portion 70 arranged on the one side in the axial direction (lower side in FIGS. 11A to 11F), and a large-diameter shaft portion 71 arranged on the other side in the axial direction (upper side in FIGS. 11A to 11F). There is a center hole 72 having a triangular cross-sectional shape on an end surface on the one side in the axial direction of the shaft portion 68. The tubular portion 69 has a bottomed hole 73 that is open only on the other side in the axial direction. The inner-peripheral surface of the tubular portion 69 (bottomed hole 73) is a cylindrical surface having an inner diameter that does not change over the entire length in the axial direction. The outer diameter of the tubular portion 69 is larger than the outer diameter D of the tube body 30 of the outer tube 11 to be manufactured, and the length in the axial direction of the tubular portion 69 is shorter than the length in the axial direction of the female-tube portion 26. On an end surface on the one side in the axial direction of the tubular portion 69, a shoulder portion 39 existing on a virtual plane orthogonal to the center axis of the tubular portion 69 is formed by contact with a mold (not illustrated).

Next, together with chamfering on the opening edge of the bottomed hole 73 of the second intermediate blank material 67, cold ironing (stretching) is performed on the second intermediate blank material 67 to obtain a third intermediate blank material 74 as illustrated in FIG. 11D. More specifically, the ironing process is performed in a range extending from the end portion on the other side in the axial direction of the tubular portion 69 of the second intermediate blank material 67 to an intermediate portion in the axial direction thereof, and the portion is stretched in the axial direction. As a result, the length in the axial direction of the tubular portion 69 is increased and the wall thickness is reduced, to process the tubular portion 69 into a stepped tubular portion 75. The stepped tubular portion 75 has a small-diameter tubular portion 76 in a range extending from the end portion on the other side in the axial direction to an intermediate portion in the axial direction, and has a large-diameter tubular portion 77 having a bottomed cylindrical shape at the end portion on the one side in the axial direction. The inner diameter of the small-diameter tubular portion 76 is equal to the inner diameter of the large-diameter tubular portion 77; however, the outer diameter of the small-diameter tubular portion 76 is smaller than the outer diameter of the large-diameter tubular portion 77. Moreover, the length in the axial direction of the small-diameter tubular portion 76 is sufficiently longer than the length in the axial direction of the large-diameter tubular portion 77. In order to increase the length in the axial direction of the small-diameter tubular portion 76 to the required length, is possible to perform the ironing process a plurality of times as necessary.

Figure 12A:
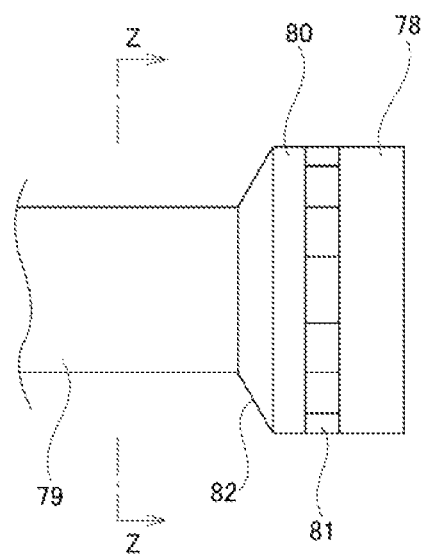
Figure 12B:
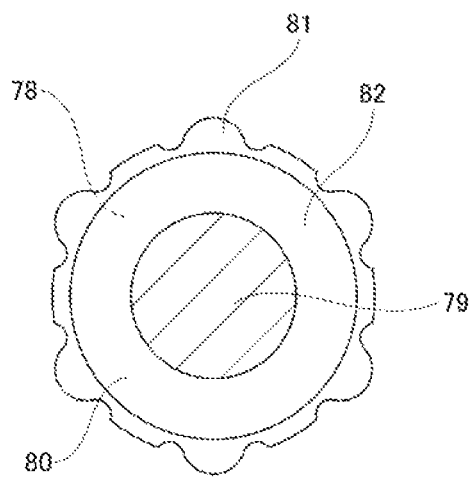

Next, as illustrated in FIG. 11D, the inner-peripheral-side engaging portion 33 is formed on the inner-peripheral surface of the stepped tubular portion 75 of the third intermediate blank material 74 using an inner-peripheral groove forming tool 78. The inner-peripheral groove forming tool 78 includes a base portion 79 having a rod shape, and a head portion 80 provided on an end portion on the one side in the axial direction of the base portion 79. The head portion 80, as illustrated in FIG. 12, has an inner-peripheral groove forming portion (land portion) 81 having an uneven shape in the circumferential direction on an intermediate portion in the axial direction of an outer-peripheral surface thereof. The inner-peripheral groove forming portion 81 has an outer-peripheral surface shape that matches the contour shape of the inner-peripheral-side engaging portion 33 to be formed (inside and outside are inverted). The head portion 80 has a guide portion 82 having a tapered shape, an outer diameter of which becomes smaller as going toward the other side in the axial direction, on an end portion on the other side in the axial direction (upper end portion in FIG. 11D, and end portion on the left side in FIG. 12A).

When forming the inner-peripheral-side engaging portion 33 on the inner-peripheral surface of the stepped tubular portion 75, the head portion 80 is inserted to the innermost portion of the bottomed hole 73a of the stepped tubular portion 75, and in that state, a mold (not illustrated) is used to reduce the diameter of the stepped tubular portion 75 over a range from the end portion on the other side in the axial direction to the intermediate portion in the axial direction, forming a reduced-diameter tubular portion 83 in that portion. After that, by removing the head portion 80 from the inside of the bottomed hole 73a toward the other side in the axial direction, the inner-peripheral-side engaging portion 33 is roughly formed on an inner-peripheral surface of the reduced-diameter tubular portion 83. As a result, as illustrated in FIG. 11E, a fourth intermediate blank material 84 is obtained.

After that, by pressing the shaft portion 68 of the fourth intermediate blank material 84 into an inner side of a die (not illustrated), the outer-peripheral-side engaging portion 27 is formed on an outer-peripheral surface of the large-diameter shaft portion 71. Moreover, a broaching process is performed on a part in a circumferential direction of an intermediate portion in the axial direction of the large-diameter shaft portion 71 to form the engaging notch 29. In addition, a machining process is performed on the outer-peripheral surface of the large-diameter tubular portion 77 in a portion on the one side in the axial direction of the stepped tubular portion 75 (portion separated to the one side in the axial direction from the inner-peripheral-side engaging portion 33). As a result, the outer diameter of the large-diameter tubular portion 77 is made to be the same as the outer diameter of the reduced-diameter tubular portion 83, and the outer tube 11 such as illustrated in FIG. 11F is obtained.

With the outer tube 11 with hole cover 19 as described above, together with being able to prevent foreign matter such as moisture from entering the inner side of the female-tube portion 26 of the other tube 11 into which the inner shaft 10 is inserted, it is possible to keep the cost of manufacturing the outer tube 11 low.

In other words, in this example, instead of forming the entire outer tube 11 into a hollow tubular shape, the outer tube 11 is configured by a male-shaft portion 25 having a central shaft shape and a female-tube portion 26 having a bottomed cylindrical shape, and thus it is possible to prevent foreign matter such as moisture from entering the inner side of the female cylinder portion 26 through the male shaft portion 25 arranged in the vehicle cabin exterior 16. Moreover, by externally fitting the hole cover 19 to a portion on the other side in the axial direction of the female-tube portion 26, the hole cover 19 covers a gap between the inner-peripheral surface of the through hole 18 provided in the dash panel 17 and the outer-peripheral surface of the female-tube portion 26. Therefore, it is possible to prevent foreign matter such as moisture or the like from entering the inner side of the female-tube portion 26 through the opening portion of the slide hole 32. Therefore, with this example, it is possible to effectively prevent foreign matter such as moisture or the like from entering the inner side of the female-tube portion 26. As a result, the operation of extending or contracting the intermediate shaft 5 can be performed smoothly over a long period of time.

Furthermore, the outer tube 11 of the present example is a cold forged product in which a solid male-shaft portion 25 and a bottomed cylindrical female-tube portion 26 are integrally provided, and thus, in manufacturing the outer tube 11, it is possible to eliminate the step of connecting the separately manufactured male-shaft portion and the female-tube portion, and it is also possible to eliminate the steps associated with the joining step. Therefore, it is possible to suppress an increase in the manufacturing cost of the outer tube 11. Moreover, there is no connecting section to connect the male-shaft portion 25 and the female-tube portion 26, and thus together with being able to maintain the strength of the outer tube 11, it is possible to sufficiently maintain the length in the axial direction of the inner-peripheral-side engaging portion 33. In addition, there is also no need for a phase matching portion for matching the phase between the male-shaft portion 25 and the female-tube portion 26, and thus together with becoming easy to maintain phase accuracy between the male-shaft portion 25 and the female-tube portion 26, it becomes easy to maintain the length in the axial direction of the inner-peripheral-side engaging portion 33. This is advantageous in maintaining the extension and contraction amount of the intermediate shaft 5.

The outer tube 11 is arranged in the vehicle cabin exterior 16 except for the end portion on the other side in the axial direction; however, of the outer surface of the female-tube portion 26, rust preventing treatment is performed for at least a portion where the hole cover 19 is externally fitted and a portion located farther on the one side in the axial direction than the portion where the hole cover 19 is externally fitted. Therefore, it is possible to prevent rust from occurring on the outer surface of the outer tube 11. Note that the male-shaft portion 25 is inserted into the engaging hole 60 of the extension shaft 6 and is not exposed to the outside, and thus rust substantially does not occur even when the male shaft portion 25 is not subjected to rust preventing treatment; however, in a case of a plating process, the male shaft portion 25 may be included in the processing target. In a case of a coating process, the film thickness formed is larger than that in a plating process, and the insertability into the engaging hole 60 may be deteriorated or the coating may be peeled off, and thus it is preferable not to include the male-shaft portion 25 as a processing target.

In the present example, the outer diameter of the portion (portion on the one side in the axial direction of the tube body 30, the bottom portion 31, and the male-shaft portion 25) of the outer tube 11 that exists farther on the one side in the axial direction than the portion (portion on the other side in the axial direction of the tube body 30) where the hole cover 19 is externally fitted is restricted to be equal to or less than the outer diameter of the portion where the hole cover 19 is externally fitted. Therefore, the hole cover 19 can be assembled from the one side in the axial direction of the outer tube 11. Moreover, since the tapered portion 37 is provided on the outer-peripheral surface of the bottom portion 31, the workability (insertability) of the assembly work of the hole cover 19 can be improved, and the weight of the outer tube 11 can be reduced.

Furthermore, the inner diameter of the seal lip 45a provided in the hole cover 19 in a free state is larger than the outer diameter of the end portion on the one side in the axial direction of the tapered portion 37 provided on the outer-peripheral surface of the bottom portion 31, and is smaller than the outer diameter on the end portion on the other side in the axial direction of the tapered portion 37, and thus when the tapered portion 37 passes through the inner side of the seal lip 45a, the interference of the seal lip 45a can be gradually increased. Therefore, it is possible to effectively prevent the seal lip 45a from being damaged during the assembling work of the hole cover 19.

Moreover, the outer-peripheral surface of the male-shaft portion 25 and the outer-peripheral surface of the female-tube portion 26 are connected through the shoulder portion 39, which is a circular ring surface, and thus the length in the axial direction of the male-shaft portion 25 (length in the axial direction of the outer-peripheral-side engaging portion 27) and the length in the axial direction of the female-tube portion 26 (length in the axial direction of the inner-peripheral-side engaging portion 33) can both be made sufficiently long within the limited overall length of the outer tube 11. Therefore, it is possible to sufficiently maintain the fitting length (engagement length) between the outer-peripheral-side engaging portion 27 of the male-shaft portion 25 and the female serration 59 of the joint portion 53, and to sufficiently maintain the amount of extension and contraction of the intermediate shaft 5. Moreover, the shoulder portion 39 is arranged to be orthogonal to the outer-peripheral surface of the tube body 30, and thus the shoulder portion 39 can also be used as a reference for the length in the axial direction of the male-shaft portion 25 and the length in the axial direction of the female-tube portion 26. Furthermore, the shoulder portion 39 can also be used to bear the pushing load in the cold forging process when manufacturing the outer tube 11.

The height Ht in the axial direction of the slide hole 32 is four times of more the outer diameter D of the tube body 30, and is preferably five times or more, and thus not only is it possible to maintain the amount of extension or contraction (displacement absorption amount) required for the intermediate shaft 5 in a state of being assembled in the vehicle body, but it is also possible to sufficiently maintain the amount of contraction (fitting length of the inner shaft 10 and outer tube 11) required for the intermediate shaft 5 during assembly work.

Moreover, the length Hf in the axial direction of the non-formed portion 34 is taken to be three times or less than the outer diameter D of the tube body 30, and thus even in a case where the intermediate shaft 5 contracts to the maximum limit during, for example, the occurrence of a collision accident or during assembly work, it is possible to prevent a situation where it is not possible to transmit torque between the inner shaft 10 and the outer tube 11.

In addition, the inner diameter of the non-formed portion 34 is larger than the circumscribed circle diameter of the inner-peripheral-side engaging portion 33, which is useful from the aspect of making the outer tube 11 more lightweight.

In the present example, when manufacturing the outer tube 11, the outer diameter of a part of the first intermediate blank material 66, which is the site finally processed into the male-shaft portion 25, is cold-formed so as to be smaller than the outer diameter of the blank material 65. Therefore, by work hardening accompanying the reduction in diameter, it is possible to sufficiently maintain the strength of the portion. Accordingly, this is advantageous in maintaining the strength of the outer tube 11.

Second Example

Figure 13A:
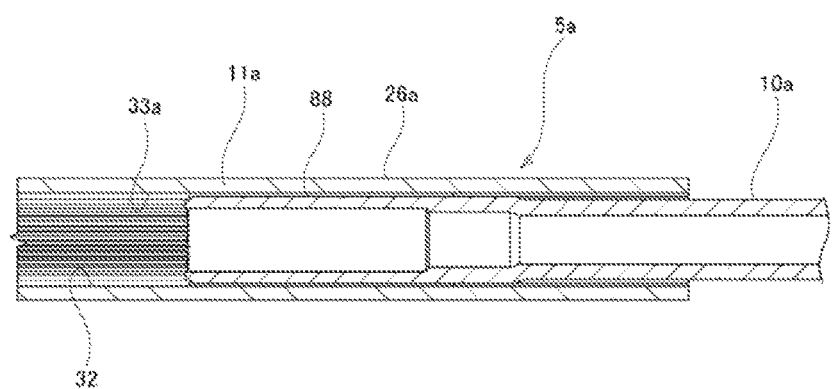
FIG. 13A and FIG. 13B correspond to FIG. 4A and FIG. 4B, and illustrate a second example of an embodiment of the present invention.
Figure 13B:
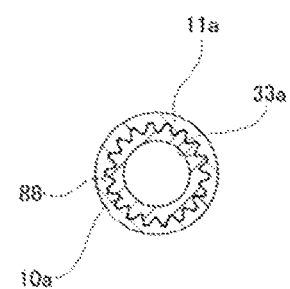

A second example of an embodiment of the present invention will be described using FIGS. 13A and 13B.

In this example, an 18-tooth female spline is formed on the inner-peripheral surface of the female-tube portion 26a of the outer tube 11a as the inner-peripheral-side engaging portion 33a having a non-circular cross-sectional shape. Correspondingly, an 18-tooth male spline 88 is formed on a portion on the one side in the axial direction of the outer-peripheral surface of the inner shaft 10a. Moreover, in this example, an inner shaft configured so as to have an overall hollow cylindrical shape is used as the inner shaft 10a. The portion on the one side in the axial direction of the inner shaft 10a is inserted into the inner side of the female-tube portion 26a of the outer tube 11a so that it is possible to transmit torque and so that relative displacement in the axial direction is possible.

In the example described above, it is possible to reduce the number of parts compared with the first example. Therefore, it is possible to improve the workability of the assembly work of the intermediate shaft 5a.

The other configuration and operational effects are the same as those of the first example.

Third Example

Figure 14A:
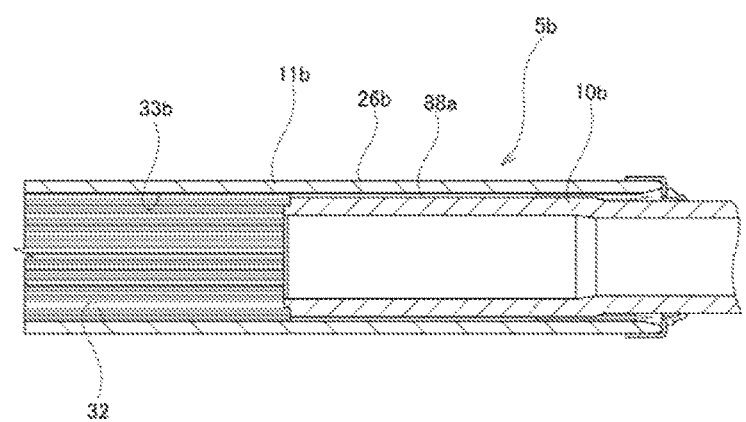
FIG. 14A and FIG. 14B correspond to FIG. 4A and FIG. 4B, and illustrate a third example of an embodiment of the present invention.
Figure 14B:
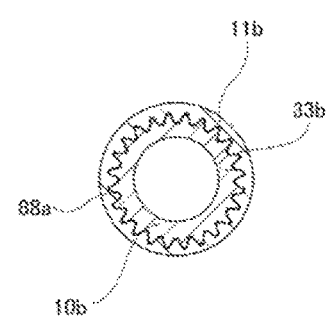

A third example of an embodiment of the present invention will be described using FIGS. 14A and 14B.

This example is a modification of the second example. In this example, a 24-tooth female spline is formed on the inner-peripheral surface of the female-tube portion 26b of the outer tube 11b as the inner-peripheral-side engaging portion 33b having a non-circular cross-sectional shape.

Correspondingly, a 24-tooth male spline 88a is formed on a portion on the one side in the axial direction of the outer-peripheral surface of the inner shaft 10b. The portion on the one side in the axial direction of the inner shaft 10b is inserted into the inner side of the female-tube portion 26b of the outer tube 11b so that it is possible to transmit torque and so that relative displacement in the axial direction is possible.

Other configurations and operational effects are the same as those of the second example, including the aspect of reducing the number of parts and improving the workability of the assembly work.

In a case of implementing the present invention, the structure of the hole cover is not limited to the structure described in the embodiments. Various conventionally known structures of a hole cover can be adopted as long as the hole cover is able to exert a function of being externally fitted to the female-tube portion of the outer tube and covering a gap between the outer tube and panel (dash panel).

In a case of implementing the present invention, the outer diameter of the tube body of the female-tube portion of the outer tube, without being made constant in the axial direction, can be such that the outer diameter of the portion that is farther on the one side in the axial direction than the portion where the hole cover is fitted is smaller than the outer diameter of the portion where the hole cover is externally fitted. Moreover, in a case of providing a tapered portion on the outer-peripheral surface of the bottom portion of the female-tube portion of the outer tube, a plurality of tapered portions having different inclination angles may be provided.

In a case of implementing the present invention, the outer tube integrally provided with the solid-shaped male-shaft portion and the bottomed cylindrical female-tube portion is not limited to the manufacturing method described in the embodiments, and can also be manufactured by other manufacturing methods.

REFERENCE SIGNS LIST

1 Steering wheel
2 Steering shaft
3 Steering column
4a, 4b Universal joint
5, 5a, 5b Intermediate shaft
6 Extension shaft
7 Steering-gear unit
8 Tie rod
9 Pinion shaft
10, 10a, 10b Inner shaft
11, 11a, 11b Outer tube
12 Ball
13 Roller
14 Plate spring
15 Vehicle cabin interior
16 Vehicle cabin exterior
17 Dash panel
18 Through hole
19 Hole cover
20 First male-side axial groove
21 Second male-side axial groove
22 Stopper
23 Yoke
24 Yoke
25 Male-shaft portion
26, 26a, 26b Female-tube portion
27 Outer-peripheral-side engaging portion
28 Non-toothed portion
29 Engaging notch
30 Tube body
31 Bottom portion
32 Slide hole
33, 33a Inner-peripheral-side engaging portion
34 Non-formed portion
35 First female-side axial groove
36 Second female-side axial groove
37 Tapered portion
38 Cylindrical surface portion
39 Shoulder portion
40 Bushing
41 Main cover body
42 Seal portion
43 Holding groove
44a, 44b Bellows portion
45a, 45b Seal lip
46 Inner shaft
47 Outer cylinder
48 Yoke portion
49 Rod-shaped portion
50 Yoke
51 Male serration
52 Main outer cylinder body
53 Joint portion
54a, 54b Coupling cylinder portion
55 Bellows portion
56 First female serration
57 Second female serration
58 Male serration
59 Female serration
60 Engaging hole
61 Slit
62 Flange portion
63 Screw hole
64 Weld bead portion
65 Blank material
66 First intermediate blank material
67 Second intermediate blank material
68 Shaft portion
69 Tubular portion
70 Small-diameter shaft portion
71 Large-diameter shaft portion
72 Center hole
73, 73a Bottomed hole
74 Third intermediate blank material
75 Stepped tubular portion
76 Small-diameter tubular portion
77 Large-diameter tubular portion
78 Inner-peripheral groove forming tool
79 Base portion
80 Head portion
81 Inner-peripheral groove forming portion
82 Guide portion
83 Reduced-diameter tubular portion
84 Fourth intermediate blank material
85a Straight portion
85b Circular arc-shaped portion
86 Seal ring
87 Fastening ring
88, 88a Male spline

The invention claimed is:

1. An outer tube with hole cover, comprising: the outer tube constituting an intermediate shaft of a steering apparatus and arranged in an assembled state in a vehicle body so as to be inserted through a panel dividing a vehicle cabin interior and a vehicle cabin exterior; and the hole cover is configured to cover a gap between the outer tube and the panel; the outer tube comprising a male-shaft portion having a solid shape, and a female-tube portion having a bottomed cylindrical shape and integrally formed with the male-shaft portion; the male-shaft portion comprising an outer-peripheral-side engaging portion having a non-circular cross-sectional shape on an outer-peripheral surface and arranged on an end portion on one side in an axial direction of the outer tube; the female-tube portion comprising a slide hole opening only to the other side in the axial direction and provided with an inner-peripheral-side engaging portion having a non-circular cross-sectional shape on an inner-peripheral surface thereof, the female-tube portion being coaxially arranged adjacent to the male-shaft portion on the other side in the axial direction of the male-shaft portion; the hole cover externally fitted to the female-tube portion; and in the assembled state in the vehicle body, the male-shaft portion being arranged in the vehicle cabin exterior and an opening portion of the slide hole being arranged in the vehicle cabin interior, wherein a tube body of the female-tube portion comprises the inner-peripheral-side engaging portion in a range from an end portion on the other side in the axial direction of an inner-peripheral surface to an intermediate portion in the axial direction of the inner-peripheral surface, and a cylindrical surface shaped non-formed portion on an end portion on the one side in the axial direction of the inner-peripheral surface.

2. The outer tube with hole cover according to claim 1, wherein the female-tube portion is subjected to a rust preventing treatment on at least a portion of an outer surface thereof where the hole cover is externally fitted and a portion of the outer surface thereof located farther on the one side in the axial direction than the portion where the hole cover is externally fitted.

3. The outer tube with hole cover according to claim 1, wherein an outer diameter of the male-shaft portion is smaller than an outer diameter of the female-tube portion, and an outer-peripheral surface of the male-shaft portion and an outer-peripheral surface of the female-tube portion are connected through a shoulder portion having a circular ring shape, the shoulder portion being an end surface on the one side in the axial direction of the female-tube portion.

4. The outer tube with hole cover according to claim 1, wherein the tube body comprises a cylindrical surface shaped outer-peripheral surface, and a bottom portion covering an opening of an end portion on the one side in the axial direction of the tube body.

5. The outer tube with hole cover according to claim 4, wherein the tube body comprises an outer diameter that is constant in the axial direction.

6. The outer tube with hole cover according to claim 4, wherein the bottom portion comprises a tapered portion having a conical surface shape in a portion on at least the one side in the axial direction of an outer-peripheral surface thereof, an outer diameter of the tapered portion decreasing as going from the other side in the axial direction toward the one side in the axial direction.

7. The outer tube with hole cover according to claim 6, wherein the hole cover comprises a seal lip on a portion on the one side in the axial direction of an inner side in the radial direction, a tip-end portion of the seal lip being in contact with the outer-peripheral surface of the tube body with interference; and an inner diameter in a free state of the seal lip is larger than an outer diameter on an end portion on the one side in the axial direction of the tapered portion, and smaller than an outer diameter of an end portion on the other side in the axial direction of the tapered portion.

8. The outer tube with hole cover according to claim 4, wherein an inner diameter of the non-formed portion is larger than a circumscribed circle diameter of the inner-peripheral-side engaging portion.

9. The outer tube with hole cover according to claim 4, wherein a length in the axial direction of the slide hole is five times or more an outer diameter of the tube body.

10. The outer tube with hole cover according to claim 4, wherein a length in the axial direction of the non-formed portion is three times or less an outer diameter of the tube body.

* * * * *